US011159043B2

(12) United States Patent
Anglin et al.

(10) Patent No.: US 11,159,043 B2
(45) Date of Patent: *Oct. 26, 2021

(54) RECHARGING OF BATTERY ELECTRIC VEHICLES ON A SMART ELECTRICAL GRID SYSTEM

(71) Applicant: International Business Machines Corporation, Armonk, NY (US)

(72) Inventors: Howard N. Anglin, Austin, TX (US); Irgelkha Mejia, Austin, TX (US); Nicholas J. Ruegger, Austin, TX (US); Yvonne M. Young, Elgin, TX (US)

(73) Assignee: International Business Machines Corporation, Armonk, NY (US)

( * ) Notice: Subject to any disclaimer, the term of this patent is extended or adjusted under 35 U.S.C. 154(b) by 551 days.

This patent is subject to a terminal disclaimer.

(21) Appl. No.: 15/610,044

(22) Filed: May 31, 2017

(65) Prior Publication Data

US 2017/0259681 A1   Sep. 14, 2017

Related U.S. Application Data

(63) Continuation of application No. 13/174,227, filed on Jun. 30, 2011, now Pat. No. 9,718,371.

(51) Int. Cl.
*B60L 53/30*   (2019.01)
*G06Q 50/06*   (2012.01)
(Continued)

(52) U.S. Cl.
CPC ........ *H02J 13/00016* (2020.01); *B60L 53/32* (2019.02); *B60L 53/63* (2019.02);
(Continued)

(58) Field of Classification Search
CPC ........ G06Q 10/02; G06Q 30/02; G06Q 30/06; G06Q 10/025; G06Q 30/0601;
(Continued)

(56) References Cited

U.S. PATENT DOCUMENTS 4,335,847 A  6/1982  Levine
4,469,274 A  9/1984  Levine
(Continued)

FOREIGN PATENT DOCUMENTS

CA   2836001 C    5/2019
CN   101811446    8/2010
(Continued)

OTHER PUBLICATIONS

J. Ferreira, P. Pereira, P. Filipe and J. Afonso, "Recommender system fordrivers of electric vehicles," 2011 3rd International Conference on Electronics Computer Technology, 2011, pp. 244-248, doi: 10.1109/ICECTECH.2011.5941995. (Year: 2011).*

(Continued)

*Primary Examiner* — George Chen
(74) *Attorney, Agent, or Firm* — Alexander G. Jochym

(57) ABSTRACT

Some example embodiments include a method for recharging a number of battery electric vehicles. The method include receiving (by a control module configured to control an electrical grid system that include a number of recharging stations that are configured to recharge the number of battery electric vehicles and from the number of battery electric vehicles) usage data that comprises a current charge level, a current location, and a planned itinerary that includes a destination. The method includes determining anticipated electrical loads in the number of sectors of the electrical grid system based on the usage data of the number of battery electric vehicles. The method also includes redistributing the electrical supply on the electrical grid system to at least one recharging station of the number of recharging stations based on the anticipated electrical loads, prior to actual usage defined by the usage data by the number of battery electric vehicles.

17 Claims, 7 Drawing Sheets

(51) Int. Cl.
| | |
|---|---|
| *H02J 3/00* | (2006.01) |
| *H02J 7/00* | (2006.01) |
| *H02J 13/00* | (2006.01) |
| *B60L 53/63* | (2019.01) |
| *B60L 55/00* | (2019.01) |
| *B60L 58/12* | (2019.01) |
| *G05F 5/00* | (2006.01) |
| *G05B 15/02* | (2006.01) |
| *G06Q 10/02* | (2012.01) |
| *G06Q 10/06* | (2012.01) |

(52) U.S. Cl.
CPC ............. *B60L 55/00* (2019.02); *B60L 58/12* (2019.02); *G05B 15/02* (2013.01); *G05F 5/00* (2013.01); *G06Q 10/02* (2013.01); *G06Q 10/0631* (2013.01); *G06Q 50/06* (2013.01); *H02J 3/005* (2013.01); *H02J 7/0027* (2013.01); *H02J 13/0062* (2013.01); *B60L 2200/26* (2013.01); *B60L 2240/62* (2013.01); *B60L 2260/54* (2013.01); *Y02B 70/30* (2013.01); *Y02B 90/20* (2013.01); *Y02E 60/00* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 20/221* (2013.01); *Y04S 30/12* (2013.01); *Y04S 40/124* (2013.01)

(58) Field of Classification Search
CPC ........ G06Q 50/30; G06Q 50/12; G06Q 50/14; G06Q 10/10; G06Q 10/109; G06Q 10/20; G06Q 20/32; G06Q 30/0641; G06Q 40/08; G06Q 10/00; G06Q 10/063; G06Q 30/00; G06Q 30/0239; G06Q 30/0255; G06Q 30/0603; G06Q 30/0613; G06Q 30/0623; G06Q 30/0625; G06Q 30/0627; G06Q 30/0645; G06Q 40/04; G06Q 40/10; G06Q 50/10; G06Q 10/04; G06Q 10/06; G06Q 10/0631; G06Q 10/06311; G06Q 10/08; G06Q 10/083; G06Q 10/087; G06Q 10/107; G06Q 20/045; G06Q 20/0457; G06Q 20/145; G06Q 20/20; G06Q 20/22; G06Q 20/24; G06Q 20/322; G06Q 20/325; G06Q 20/327; G06Q 20/3274; G06Q 20/3278; G06Q 20/34; G06Q 20/40; G06Q 20/4016; G06Q 20/425; G06Q 30/014; G06Q 30/0202; G06Q 30/0206; G06Q 30/0208; G06Q 30/0209; G06Q 30/0215; G06Q 30/0222; G06Q 30/0224; G06Q 30/0235; G06Q 30/0236; G06Q 30/0254; G06Q 30/0261; G06Q 30/0267; G06Q 30/0268; G06Q 30/0273; G06Q 30/0277; G06Q 30/0283; G06Q 30/04; G06Q 30/0605; G06Q 30/0609; G06Q 30/0611; G06Q 30/0635; G06Q 30/0639; G06Q 30/0643; G06Q 30/08; G06Q 40/00; G06Q 40/02; G06Q 50/00; G06Q 50/01; G06Q 50/188; G06Q 50/22; G06Q 50/265; G06Q 99/00
See application file for complete search history.

(56) References Cited

U.S. PATENT DOCUMENTS

| | | |
|---|---|---|
| 5,259,445 A | 11/1993 | Pratt |
| 5,400,246 A | 3/1995 | Wilson |
| 5,481,481 A | 1/1996 | Frey |
| 5,566,879 A | 10/1996 | Pierre |
| 5,583,418 A | 12/1996 | Honda |
| 5,595,342 A | 1/1997 | McNair |
| 5,632,614 A | 5/1997 | Consadori |
| 5,742,516 A | 4/1998 | Olcerst |
| 5,781,024 A | 7/1998 | Blomberg |
| 5,790,976 A | 8/1998 | Boll et al. |
| 5,793,296 A | 8/1998 | Lewkowicz |
| 5,911,747 A | 6/1999 | Gauthier |
| 6,062,482 A | 5/2000 | Gauthier |
| 6,176,436 B1 | 1/2001 | Gauthier |
| 6,578,770 B1 | 6/2003 | Rosen |
| 6,742,349 B1 | 6/2004 | Kawai |
| 7,250,870 B1 | 7/2007 | Viner |
| 8,090,477 B1 | 1/2012 | Steinberg |
| 8,138,690 B2 | 3/2012 | Chemel |
| 8,988,232 B1 | 3/2015 | Sloo |
| 9,274,540 B2 | 3/2016 | Anglin |
| 9,718,371 B2 | 8/2017 | Anglin |
| 10,513,192 B2 | 12/2019 | Anglin |
| 2003/0102382 A1 | 6/2003 | Gauthier |
| 2004/0079093 A1 | 4/2004 | Gauthier |
| 2004/0088104 A1 | 5/2004 | Izbicki |
| 2004/0117330 A1 | 6/2004 | Ehlers |
| 2004/0133314 A1 | 7/2004 | Ehlers |
| 2004/0259545 A1 | 12/2004 | Morita |
| 2005/0006488 A1 | 1/2005 | Stanimirovic |
| 2005/0212681 A1 | 9/2005 | Dzurko |
| 2006/0038672 A1 | 2/2006 | Schoettle |
| 2006/0049268 A1 | 3/2006 | Weimer |
| 2006/0106510 A1 | 5/2006 | Heffington |
| 2007/0043478 A1 | 2/2007 | Ehlers |
| 2007/0088465 A1 | 4/2007 | Heffington |
| 2007/0099136 A1 | 5/2007 | Cook |
| 2007/0099137 A1 | 5/2007 | Donnelly |
| 2007/0120693 A1 | 5/2007 | Vij |
| 2007/0131784 A1 | 6/2007 | Garozzo |
| 2007/0142927 A1 | 6/2007 | Nelson |
| 2007/0233420 A1 | 10/2007 | Potucek |
| 2008/0048046 A1 | 2/2008 | Wagner |
| 2008/0054082 A1 | 3/2008 | Evans |
| 2008/0078337 A1 | 4/2008 | Donelly |
| 2008/0099570 A1 | 5/2008 | Steve |
| 2008/0182215 A1 | 7/2008 | Sid |
| 2008/0182506 A1 | 7/2008 | Jackson |
| 2008/0203973 A1 | 8/2008 | Gale et al. |
| 2008/0284579 A1 | 11/2008 | Contreras |
| 2008/0289834 A1 | 11/2008 | Edwards |
| 2008/0290183 A1 | 11/2008 | Laberge |
| 2009/0134993 A1 | 5/2009 | Ashworth |
| 2009/0210357 A1 | 8/2009 | Pudar et al. |
| 2009/0243852 A1 | 10/2009 | Haupt |
| 2009/0253087 A1 | 10/2009 | Donnelly |
| 2009/0302996 A1 | 12/2009 | Sokwoo |
| 2010/0019921 A1 | 1/2010 | Barrett |
| 2010/0023865 A1 | 1/2010 | Fulker |
| 2010/0039067 A1 | 2/2010 | Hill et al. |
| 2010/0082464 A1 | 4/2010 | Keefe |
| 2010/0106401 A1 | 4/2010 | Naito et al. |
| 2010/0106641 A1 | 4/2010 | Chassin et al. |
| 2010/0141205 A1 | 6/2010 | Tyler et al. |
| 2010/0169008 A1 | 7/2010 | Niwa et al. |
| 2010/0207772 A1 | 8/2010 | Yamamoto |
| 2010/0256846 A1 | 10/2010 | Shaffer |
| 2010/0280675 A1 | 11/2010 | Tate, Jr. et al. |
| 2011/0025267 A1 | 2/2011 | Kamen et al. |
| 2011/0025556 A1 | 2/2011 | Bridges et al. |
| 2011/0032110 A1 | 2/2011 | Taguchi |
| 2011/0035073 A1 | 2/2011 | Ozog |
| 2011/0050168 A1 | 3/2011 | Yoo et al. |
| 2011/0113120 A1 | 5/2011 | Johnson |
| 2011/0191265 A1 | 8/2011 | Lowenthal et al. |
| 2012/0095614 A1 | 4/2012 | Delayo |
| 2012/0109519 A1* | 5/2012 | Uyeki ............ B60L 7/14 701/439 |
| 2012/0185105 A1* | 7/2012 | McMullin ........ B60L 53/14 700/291 |
| 2012/0233077 A1 | 9/2012 | Tate, Jr. et al. |

(56) References Cited

U.S. PATENT DOCUMENTS

| | | | |
|---|---|---|---|
| 2012/0253527 A1 | 10/2012 | Hietala | |
| 2012/0296678 A1* | 11/2012 | Boot | G06Q 10/02 705/5 |
| 2012/0305661 A1 | 12/2012 | Malchiondo | |
| 2013/0006677 A1 | 1/2013 | Anglin et al. | |
| 2013/0018513 A1 | 1/2013 | Metselaar | |
| 2013/0054033 A1 | 2/2013 | Casilli | |
| 2013/0066474 A1 | 3/2013 | Pienta | |
| 2013/0085613 A1 | 4/2013 | Bester et al. | |
| 2013/0095868 A1 | 4/2013 | Salsbury | |
| 2013/0123991 A1 | 5/2013 | Richmond | |
| 2013/0173064 A1 | 7/2013 | Fadell | |
| 2013/0173326 A1 | 7/2013 | Anglin et al. | |
| 2013/0226354 A9 | 8/2013 | Ruff | |
| 2013/0321637 A1 | 12/2013 | Frank | |
| 2013/0338839 A1 | 12/2013 | Rogers | |
| 2014/0005839 A1 | 1/2014 | Stefanski | |
| 2014/0034284 A1 | 2/2014 | Butler | |
| 2014/0052300 A1 | 2/2014 | Matsuoka | |
| 2014/0058567 A1 | 2/2014 | Matsuoka | |
| 2014/0088918 A1 | 3/2014 | Miller | |
| 2014/0277761 A1 | 9/2014 | Matsuoka | |
| 2015/0097689 A1 | 4/2015 | Logue | |
| 2016/0137085 A1 | 5/2016 | Anglin et al. | |
| 2017/2596811 | 9/2017 | Anglin | |

FOREIGN PATENT DOCUMENTS

| | | |
|---|---|---|
| CN | 102271959 | 12/2011 |
| CN | 102693458 | 9/2012 |
| CN | 1595066 | 3/2015 |
| CN | 103562001 B | 5/2016 |
| DE | 2627532 A1 | 12/1976 |
| DE | 102008053141 | 4/2010 |
| DE | 112010000433 | 8/2012 |
| EP | 1162586 | 12/2001 |
| EP | 1275936 | 1/2003 |
| EP | 2627532 B1 | 8/2013 |
| JP | 2014525225 A | 9/2014 |
| SG | 191209 A1 | 7/2013 |
| WO | 2008070163 | 6/2008 |
| WO | 2010081141 | 7/2010 |
| WO | 2013000687 A1 | 1/2013 |

OTHER PUBLICATIONS

"Assessment of Plug-in Electric Vehicle Integration with ISO/RTO Systems", IRC ISO/RTO Council, Mar. 2010, 121 pages.
"Chinese Application No. 201280025500.X Search Report and Written Opinion", dated Oct. 28, 2015, 6 pages.
"CN Application No. 201280025500.X IDS", Apr. 3, 2015, 5 pages.
"EP Application No. 2012060964 International Search Report", dated Oct. 23, 2012, 8 pages.
"Nissan Introduces Its Own Level III EV Quick Charger in Japan", Green Car Congress, May 21, 2010, 3 pages.
"Open, Standard Smart Grid Communications Networks", Trilliant, 2010, 3 pages.
"Transit and Congestion Pricing", U.S. Department of Transportation, Federal Highway Administration, Apr. 2009, 24 pages.
"U.S. Appl. No. 13/174,227 Final Office Action", dated Feb. 27, 2015, 6 Pages.
"U.S. Appl. No. 13/174,227 Final Office Action", dated Dec. 30, 2016, 9 pages.
"U.S. Appl. No. 13/174,227 Final Office Action", dated May 29, 2014, 18 Pages.
"U.S. Appl. No. 13/174,227 Office Action", dated Jul. 5, 2016, 10 pages.
"U.S. Appl. No. 13/174,227 Office Action", dated Dec. 4, 2013, 14 pages.
"U.S. Appl. No. 13/174227 Office Action", dated Oct. 3, 2014, 5 pages.
"U.S. Appl. No. 13/777,088 Final Office Action", dated Jun. 25, 2015, 9 pages.
"U.S. Appl. No. 13/777,088 Office Action", dated Jan. 28, 2015, 9 Pages.
"With Electric Cars soon to Arrive, Where is Charging Headed?", SunPluggers, Sep. 10, 2010.
Garthwaite, "10 Electric Car Smart Charging Players to Watch", GIGAOM, Aug. 31, 2009, 10 pages.
Gartner, "Fast Electric Car Charging Is Slowly Picking Up Speed", plugincars, Apr. 13, 2011, 8 pages.
Stevens, "Coulomb begins worldwide EV domination with ChargePoint expansion to Australia and Poland", Engadget, May 29, 2010, 4 pages.
Stevens, "JFE Engineering's quick auto charger does 50% charge in three minutes, hits parking lots in March", Engadget, Jul. 6, 2010, 3 pages.
"Gong, Qiuming, et al., Trip-Based Optimal Power Management of Plug-In Hybrid Eletric Vehicles, IEEE Transactions on Vehicular Technology, vol. 57, No. 6, Nov. 2008".

\* cited by examiner

RECHARGING OF BATTERY ELECTRIC VEHICLES ON A SMART ELECTRICAL GRID SYSTEM

RELATED APPLICATIONS

This application is a Continuation of, and claims the priority benefit of, U.S. application Ser. No. 13/174,227 filed Jun. 30, 2011.

BACKGROUND

Embodiments of the inventive subject matter generally relate to the field of electrical power, and, more particularly, to recharging of battery electric vehicles.

Battery electric vehicles use electric motors powered by rechargeable battery packs for propulsion. Battery electric vehicles are in contrast to the conventional vehicles that use internal combustion engines for propulsion. Recharging stations are becoming more prevalent to enable operators of these battery electric vehicles to recharge their rechargeable battery packs. The recharging stations can be coupled to an electrical grid system.

The electrical grid systems could be strained if battery electric vehicles are plugged in en masse at times of peak electricity demand. Utilities are likely to offer discounted rates to encourage off-peak charging, especially overnight. However in a system where most vehicles can be battery electric vehicles (BEVs), charging demand will be high even during peak hours. Also, because these devices (unlike houses) are mobile, the location of the electrical need is not as predictable.

SUMMARY

Some example embodiments include a method for recharging a number of battery electric vehicles. The method include receiving (by a control module configured to control an electrical grid system that include a number of recharging stations that are configured to recharge the number of battery electric vehicles and from the number of battery electric vehicles) usage data that comprises a current charge level, a current location, and a planned itinerary that includes a destination. The method includes determining, by the control module, anticipated electrical loads in the number of sectors of the electrical grid system based on the usage data of the number of battery electric vehicles. The method also includes redistributing, by the control module, the electrical supply on the electrical grid system to at least one recharging station of the number of recharging stations based on the anticipated electrical loads, prior to actual usage defined by the usage data by the number of battery electric vehicles.

Some example embodiments include a method for recharging a mass transit battery electric vehicle. The method includes receiving, by a control module and from the mass transit battery electric vehicle while in transit along a route having a number of stops for passenger pickup, a current charge level and a current location. The number of stops includes recharging stations configured to recharge the mass transit battery electric vehicle. The method includes receiving, by the control module and from a next stop of the number of stops along the route for the mass transit battery electric vehicle, an anticipated stop time at the next stop for the mass transit battery electric vehicle. The method includes determining, by the control module, a required power output to be supplied to the mass transit battery electric vehicle by the recharging station at the next stop based on the current charge level. The required power output comprises an amount of power to be supplied within the anticipated stop time at the next stop. Also, the required power output comprises the amount of power needed to satisfy a minimum amount of charge to enable the mass transit battery electric vehicle to arrive at a subsequent stop of the number of stops after the next stop. The method includes transmitting, to the recharging station at the next stop, the required power output to be supplied to the mass transit battery electric vehicle by the recharging station.

Some example embodiments include a computer program product for recharging a number of battery electric vehicles. The computer program product includes a computer readable storage medium having computer usable program code embodied therewith. The computer usable program code includes a computer usable program code configured to receive from the number of battery electric vehicles that are to recharge at a number of recharging stations of an electrical grid system usage data. The usage data includes a current charge level, a current location, and a planned itinerary that includes a destination. The computer usable program code is configured to determine anticipated electrical loads at the number of recharging stations of the electrical grid system based on the usage data of the number of battery electric vehicles. The computer usable program code is configured to deny access to at least one recharging station of the number of recharging stations by at least one battery electric vehicle of the number of battery electric vehicles based on the anticipated electrical loads in the number of sectors of the electrical grid system.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
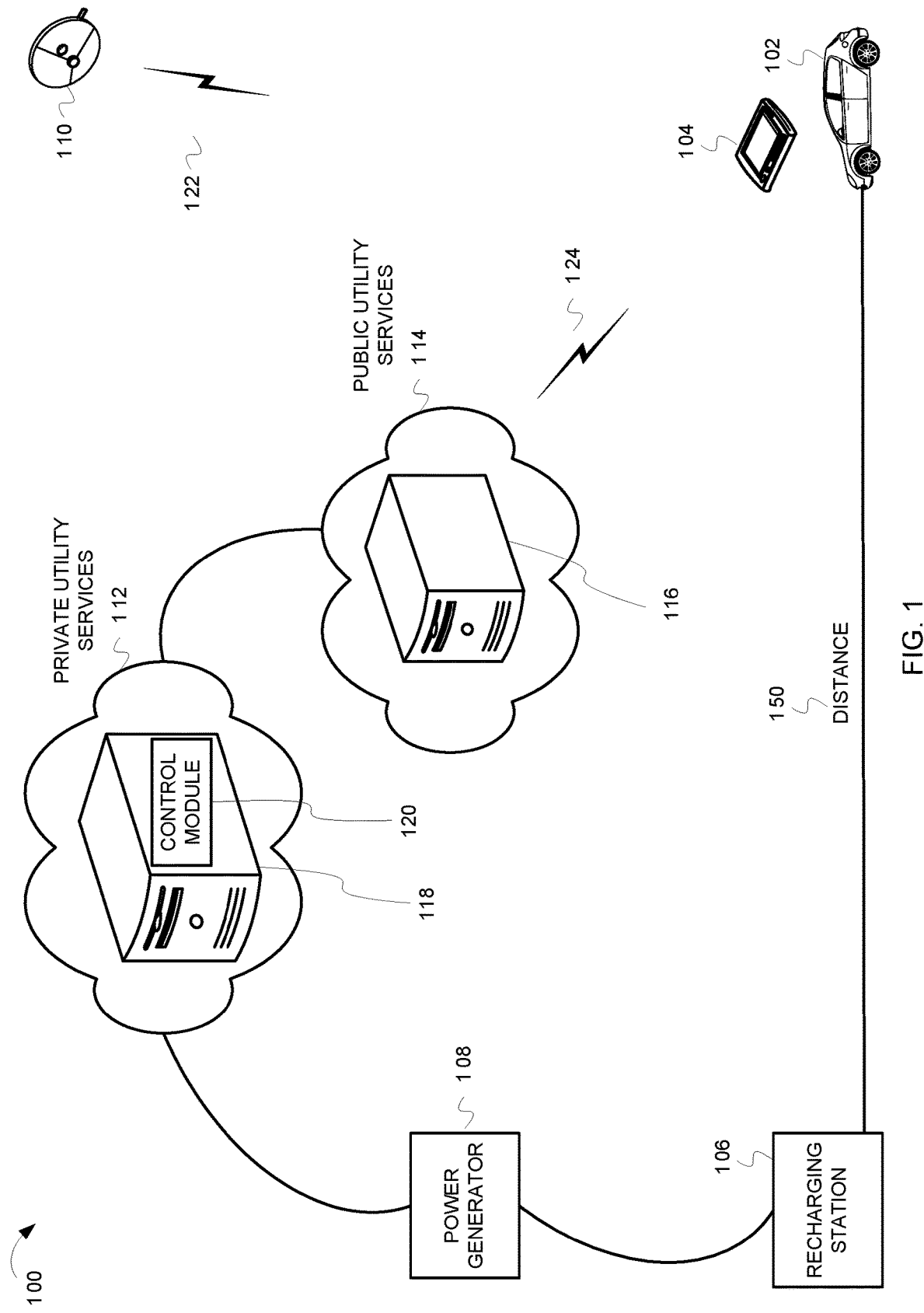
FIG. 1 depicts a system for recharging a battery electric vehicle, according to some example embodiments.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

In some example embodiments, an electrical grid system supplies electrical power of a network to a number of recharging stations that can be used by operators of battery electric vehicles to recharges their vehicles. In some example embodiments, the electrical grid system collects usage data from the different battery electric vehicles. The electrical grid system can receive this data based on different types of network communications (wired and wireless). For example, the system can receive this data wireless from an onboard computer of the battery electric vehicle, a smart phone of the operator that is communicatively coupled to the onboard computer of the battery electric vehicle, etc.

In some example embodiments, a battery electric vehicle provides its usage data (including remaining charge, current location, etc.). In response to receiving the usage data, a control module of the electrical grid system can determine vehicle current charge needs and provide the driver of the battery electric vehicle with optimal recharge locations. For example, the optimal recharge location can be the location having the least impact on the electrical grid, the location that is least expensive, the location that can recharge the quickest (the recharge time), the location have the least environmental impact, etc. While conventional Global Positioning Systems (GPSs) can provide a nearest recharging location, these conventional systems do not provide the driver with suggestions of a recharging location based on knowledge of vehicle density, price, recharge time, etc. (as described herein).

Accordingly, some example embodiments provide an integrated approach for recharging of battery electric vehicles that includes providing information to the electrical grid system regarding a driver's potential recharging needs for their vehicle based on their location. The control module of the electrical grid system can use this data to distribute load to other parts of the electrical grid that has more capacity. The control module can distribute the load by suggesting alternative recharging locations for a vehicle and/or by denying recharging at particular recharging stations.

The drivers can provide their battery electric vehicle's current charge level and destination. Based on this data, the control module of the electrical grid system can dynamically shift electrical supply on the grid to anticipate localized demand. For example, if a certain number of vehicles will require recharge in certain recharging stations and the current electrical supply for these recharging stations is insufficient, the control module can shift electrical supply from other parts of its system that will be underused during this time to these recharging stations (thereby satisfying this demand that is to occur because of upcoming recharges of these vehicles). Accordingly, because these battery electric vehicles transmit their current charge level and proposed destination, the control module of the electrical grid system is able to more accurately predict the likelihood of the need for a recharging session at particular recharging stations.

The drivers of the battery electric vehicles can rely on a device (e.g., onboard computer) within their vehicle or a separate device (e.g., a driver's mobile device, such as a smart phone) to determine and enter the following information about the vehicle into the electrical grid system—1) current charge level, 2) current location, and 3) planned itinerary. In some example embodiments, based on this usage data provided about the battery electric vehicle, the control module of the electrical grid system determines if the driver will be unable to complete the trip defined by their planned itinerary. If the driver is unable, the control module can provide an alternative itinerary, different optimal recharging locations to recharge the vehicle, etc. In some example embodiments, the control module provides suggested recharging stations based on one or more of the following: 1) price, 2) density of vehicles at the recharging station, 3) traffic near the recharging station, 4) learned patterns established from typically-used recharging stations, 5) changes in elevations on the route, etc.

As further described below, some example embodiments incorporate dynamic pricing for power supplied at the charging stations. The pricing can be based on both demand and other service oriented needs. Also, some example embodiments have application to mass transit battery electric vehicles (e.g., buses, trains, etc.).

FIG. 1 depicts a system for recharging a battery electric vehicle, according to some example embodiments. FIG. 1 depicts a system 100 that illustrates a single battery electric vehicle (a battery electric vehicle 102) and a single recharging station (a recharging station 106). The system 100 can be expanded to cover any number of battery electric vehicles and recharging stations. The system 100 also includes public utility services 114, private utility services 112, a Global Positioning System (GPS) satellite 110, and a power generator 108. A mobile device 104 can be owned by an operator of the battery electric vehicle 102 and can be various types of devices (e.g., smart phone, Personal Digital Assistant (PDA), tablet computer, notebook computer, etc.).

The public utility services 114 include a server 116, and the private utility services 112 include a server 118. These services can include other types of devices and computers for receiving and transmitting network communications and providing control of different parts of the system 100 (as further described below). While shown as being separate, the operations provided by the private utility services 112 and the public utility services 114 can be combined. In this example, the server 118 includes a control module 120. The control module 120 can be software, firmware, hardware or a combination thereof. For example, the control module 120 can be software that is loaded into a processor for execution therein.

The GPS satellite 110 transmits a GPS signal 122 to at least one of the battery electric vehicle 102 and the mobile device 104. For example, the battery electric vehicle 102 can have an onboard computer. The onboard computer and the mobile device 104 can determine a global position of the battery electric vehicle 102 based on the GPS signal 122. At least one of the battery electric vehicle 102 and the onboard computer is also communicatively coupled to the server 116 (wireless communication 124). The server 116 is communicatively coupled to the server 118. The server 118 is communicatively coupled to the power generator 108. The power generator 108 is communicatively coupled to the recharging station 106 to provide power to the recharging station 106 that is to be used for recharging battery electric vehicles. The communications between the server 116 and the server 118, the server 118 and the power generator 108 can be wired or wireless. In this example, the battery electric vehicle 102 is a distance 150 from the recharging station 106.

In some example embodiments, the driver of the battery electric vehicle 102 provides their battery electric vehicle's current charge level and destination to the control module 120. Based on this data, the control module 120 can dynamically shift electrical supply on the grid to anticipate localized demand. For example, if a certain number of vehicles will require recharge at the recharging station 106 and the current electrical supply for the recharging station 106 is insufficient, the control module 120 can shift electrical supply from other parts of its system that will be underused during this time to the recharging station 106 (thereby satisfying this demand that is to occur because of upcoming recharges of these vehicles). In particular, the power generator 108 can be supplying power to multiple recharging stations (not shown in FIG. 1). The control module 120 can transmit instructions to the power generator 108 to supply additional power to the recharging station 106 and supply less power to the other recharging stations. Accordingly, because these battery electric vehicles transmit their current charge level and proposed destination, the control module 120 is able to more accurately predict the likelihood of the need for a recharging session at particular recharging stations.

Using at least one the mobile device 104 and an integrated device (e.g., onboard computer) of the battery electric vehicle 102, the driver of the battery electric vehicle 102 provides, to the control module 120 (through the communication 124) one or more of the following: 1) current charge level, 2) current location, and 3) planned itinerary. In some example embodiments, based on this usage data provided about the battery electric vehicle 102, the control module 120 determines if the driver will be unable to complete the trip defined by their planned itinerary. If the driver is unable, the control module 102 provides an alternative itinerary, different optimal recharging locations to recharge the vehicle, etc. In some example embodiments, the control module 120 provides, to the driver, suggested recharging stations based on one or more of the following: 1) price, 2) density of vehicles at the recharging station, 3) traffic near the recharging station, 4) learned patterns established from typically-used recharging stations, 5) changes in elevations on the route, etc.

In some example embodiments, the control module 120 determines future charging needs of multiple battery electric vehicles (BEVs). For example, the battery electric vehicles can transmit their charging needs prior to arriving at a recharging station for a recharge session. The battery electric vehicles can also transmit an indication that a charging session is needed at a recharging station. The charging needs can be based on the current location and current charge of the battery electric vehicle and the location of a selected recharging station.

In some example embodiments, the driver of the battery electric vehicle 102 is provided with an interface to interact with the electrical grid system. For example, a web service or Software as a Solution (SaaS) implementation can allow for this interaction with the control module 120, the recharging station 106, etc. from any location. This interface can be provided through any type of device (e.g., smart phone, onboard computer on the battery electric vehicle, etc.).

In some example embodiments, the control module 120 determines a charge rate for a charge station for the battery electric vehicle 102 prior to arrival. The control module 120 can then provide this charge rate to the battery electric vehicle 102 prior to arrival. The control module 120 can make this determination of the charge rate based on the number of battery electric vehicles and amount of power needed for such vehicles currently charging at the recharging station 106, the number of battery electric vehicles and amount of power needed for such vehicles that are to arrive for charging at the recharging station 106, the time of day, the location of the recharging station 106, etc.

The recharging station 106 can vary the amount of power output provided to the battery electric vehicle 102. A larger power output for a given time T can cost more than a lesser power output for the same time T. In some example embodiments, this variable power output is used to provide power to the battery electric vehicle 102 in a charge time ($t_{charge}$) that satisfies a required time to reach the desired recharging station or final destination ($T_{total}$). Also, the time of the commute ($t_{commute}$) based on various conditions (traffic, weather, etc.) is also factor:

$$T_{total} = t_{charge} + t_{commute}$$

Accordingly, if the time of the commute is greater because of traffic, weather, etc., the power output at the recharging station 106 can be increased to lower the charge time so that the total time can be met. Conversely, if the time of the commute is less, the power output at the recharging station 106 can be decreased to increase the charge time so that the total time can be met.

In some example embodiments, the control module 120 provides the driver of the battery electric vehicle 102 with environmental impact feedback information for a charging request for a selected charge session and projected impact at alternative times or recharging locations. For example, power being provided at a recharging station from solar or wind would have less environmental impact than power being provided by a different recharging station that is derived from traditional power sources (e.g., hydrocarbons).

In some example embodiments, the control module 120 incorporate dynamic pricing for power supplied at the recharging stations. The pricing can be based on both demand and other service oriented needs. Two common denominators for drivers of battery electric vehicles include 1) locations available for recharging, and 2) the time required to recharge. A pricing model can be based on these two denominators. In some example embodiments, the control module 120 enables a driver of a battery electric vehicle to reserve a spot at a particular recharging station for a specific time and for a specific time period. In some example embodiments, a driver of a battery electric vehicle can reserve a spot at a particular charging station for a specific time period (independent of a specific time). A driver of a battery electric vehicle can also reserve a spot at for a specific time period (independent of a specific time and independent of a particular charging station). In other words, the driver can charge their battery electric vehicle for a set time period (e.g., one hour) at any recharging location at any time. The driver of a battery vehicle can purchases these different types of recharges and be provided with some type of electronic token that is presented for redemption. For example, the driver can transmit the electronic token to the control module 120 for redemption through a wireless communication using their smart phone, the onboard computer of the battery electric vehicle, etc. This electronic token communication can also be performed in real time, directly or indirectly through an intermediary service (e.g., electronic advertisements).

In some example embodiments, the control module 120 varies the pricing for power based on willingness of the driver to accept an indeterminate charge time. For example, the driver of the battery electric vehicle 102 can purchase an 80% recharge of their battery electric vehicle 102 at the recharging station 106. However, the time period required to charge to 80% is indeterminate but within a certain range. Charge time can vary. For example, charge time can increase or decrease dynamically based on real time demand. Charge time can also increase or decrease dynamically based on the driver's willingness to pay a premium for preferential or unrestricted service.

Figure 2:
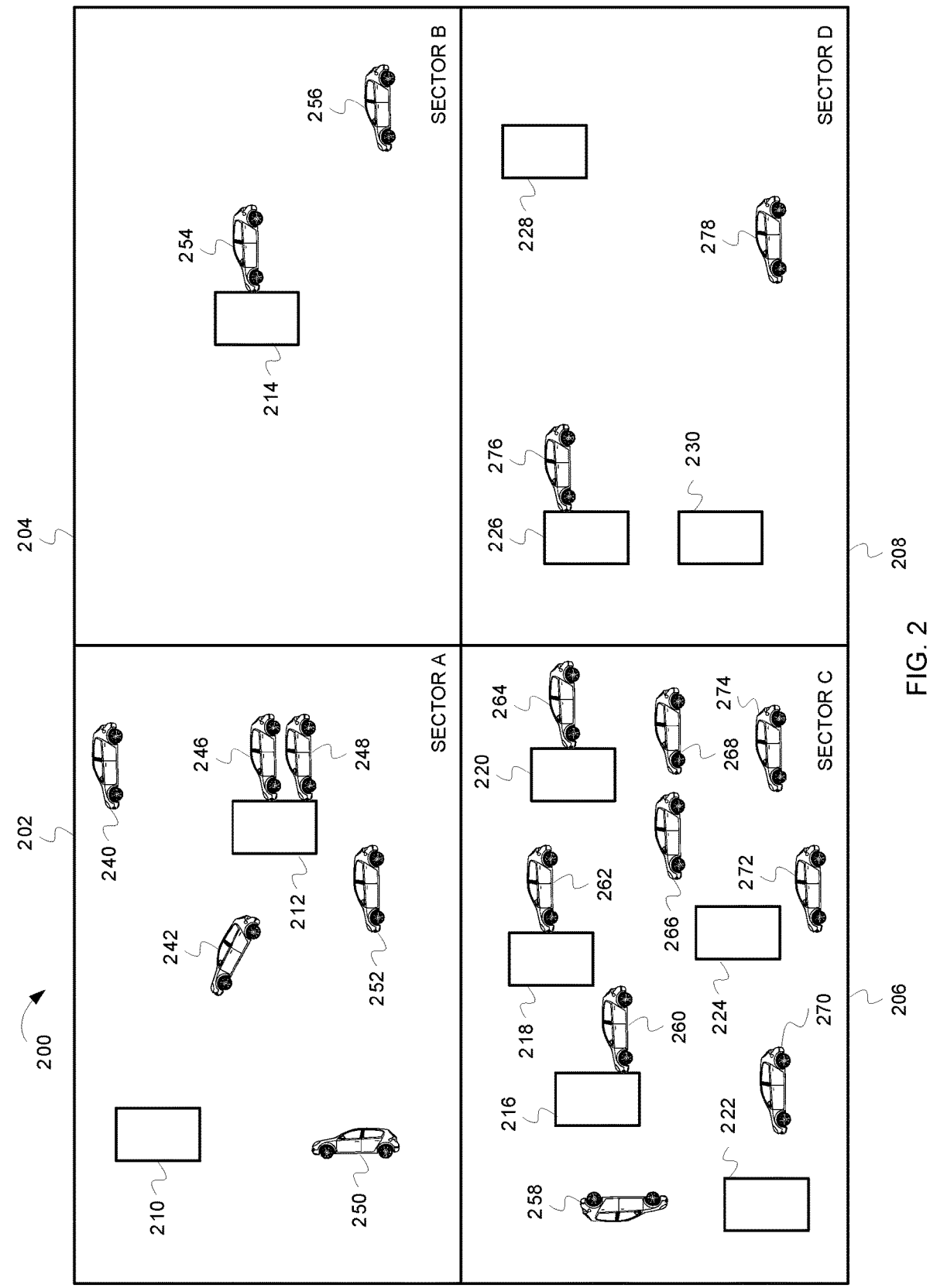
FIG. 2 depicts a segmentation of a geographical location having recharging stations for recharging battery electric vehicles, according to some example embodiments.

In some example embodiments, the power distribution across multiple recharging stations dynamic and is based on a number of factors (e.g., usage, traffic density, cost, etc.). To illustrate, FIG. 2 depicts a segmentation of a geographical location having recharging stations for recharging battery electric vehicles, according to some example embodiments. A segmentation 200 can be of any type of geographical location having recharging stations therein. For example, the geographical location can be a part of a city, an entire city, a county, a state, a country, etc. In this example, the segmentation 200 includes four different sectors—a sector A 202, a sector B 204, a sector C 206, and a sector D 208. As shown, the different sectors have varying density of recharging locations and battery electric vehicles. The battery electric vehicles are not constrained to a given sector and can travel among any of the sectors.

The sector A 202 includes two recharging stations—a recharging station 210 and a recharging station 212. In the snapshot shown, there are six battery electric vehicles in the sector A 202—a battery electric vehicle 240, a battery electric vehicle 242, a battery electric vehicle 246, a battery electric vehicle 248, a battery electric vehicle 250, and a battery electric vehicle 252. The sector B 204 includes one recharging station—a recharging station 214. In the snapshot shown, there are two battery electric vehicles in the sector B 204—a battery electric vehicle 254 and a battery electric vehicle 256.

The sector C 206 includes five recharging stations—a recharging station 216, a recharging station 218, a recharging station 220, a recharging station 222, and a recharging station 224. In the snapshot shown, there are nine battery electric vehicles in the sector C 206—a battery electric vehicle 258, a battery electric vehicle 260, a battery electric vehicle 262, a battery electric vehicle 264, a battery electric vehicle 266, a battery electric vehicle 268, a battery electric vehicle 270, a battery electric vehicle 272, and a battery electric vehicle 274. The sector D 208 includes three recharging stations—a recharging station 226, a recharging station 228, and a recharging station 230. In the snapshot shown, there are two battery electric vehicles in the sector D 208—a battery electric vehicle 276 and a battery electric vehicle 278. In some example embodiments, the control module 120 (shown in FIG. 1) dynamically distributes the power to the different recharging stations based on usage data that is received from the battery electric vehicles in real time.

There are also other results of these battery electric vehicles transmitting their current charge level and proposed destination to the electrical grid system. For example, mobile rescue charge units can be more easily dispatched if a battery electric vehicle is stranded between recharging stations because it is out of charge. Another result can be dynamically setting preferential charging rates based on the willingness of operators to disclose this information and based on the number and density of operators who do disclose. In particular, an operator can be provided with a discounted charge rate for their disclosure. Another result can be dynamically setting preferential charging rates based on the willingness of the operators to go to an alternative recharging station (to reduce electrical load in a given sector of the electrical grid).

In some example embodiments, the control module 120 (see FIG. 1) leverages the knowledge of the future charging needs and locations of the battery electric vehicles to accurately project power needs some time in the future in variable increments of time. Based on this knowledge, the control module 120 redistributes power on the electrical grid that supplies power to the various recharging stations used by the battery electric vehicles. The control module 120 provides more power to specific recharging stations, sectors, etc. on the power grid or increase associated generating capacity (based on anticipation of the need rather than being reactive to power needs on the power grid). For example, based on usage data received from the different battery electric vehicles, the control module 120 shifts power being supplied to the recharging stations 226-230 in the sector D to the recharging stations 210-210 in the sector A.

In some example embodiments, the control module 120 (see FIG. 1) provides a location based service that determines the current power needs of a battery electric vehicle at location X and the calculated power needs of the battery electric vehicle once the destination of the desired charging station is reached (location X+ΔX). The control module 120 determines the most desirable charging station for a battery electric vehicle based on a number of factors (e.g., current charging needs, current location, environmental conditions, cost basis, etc.). For example, for the battery electric vehicle 256, the recharging station 214 is close but requires the battery electric vehicle 256 is travel up a hill, while the recharging station 226 can be farther and not require the battery electric vehicle 256 to travel up a hill. In such a situation, the control module 120 can recommend the recharging station 226 can be the most desirable recharging station for the battery electric vehicle 256.

In some example embodiments, the control module 120 (see FIG. 1) leverages the information about the charge time ($t_{charge}$) and the time of the compute ($t_{commute}$) for the different battery electric vehicles that use the electrical grid in order to redistribute the power at the different charging stations. In particular, the control module 120 can determine the power output at each of a selected series of recharging stations in order to fulfill the charge level requirements of itineraries of the different battery electric vehicles (taking into consideration the charge times at each station).

In some example embodiments, the power output at the recharging stations affects the price. For example, power output X per unit of time costs more than power output Y per same unit of time (where X is greater than Y). The pricing for power supplied at recharging stations can also be based on congestion relative to the recharging stations. The higher congestion for usage of power at the recharging station causes the price of the power supplied to increase.

Figure 3:
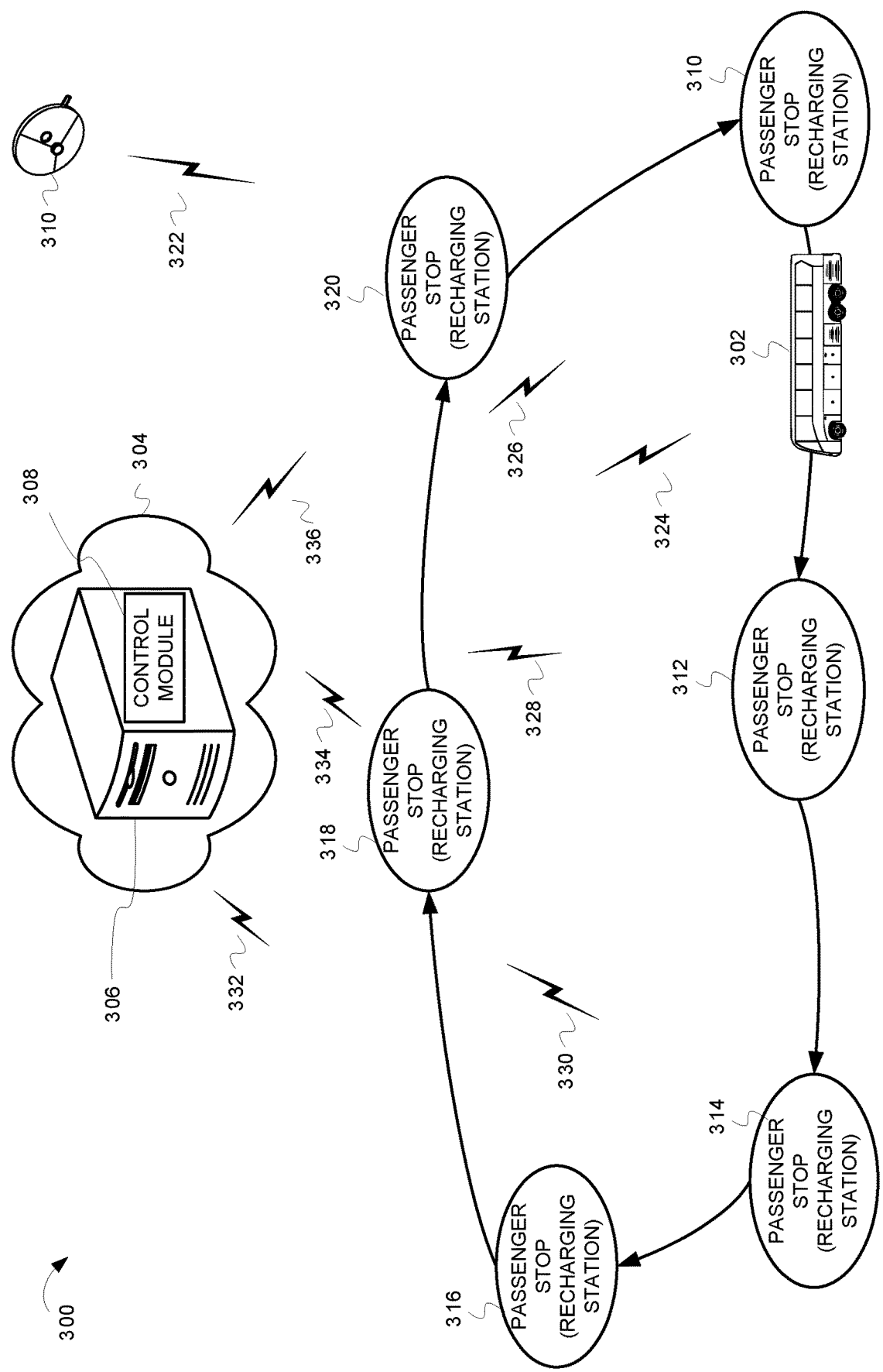
FIG. 3 depicts a system for recharging mass transit battery electric vehicles at passenger stops, according to some example embodiments.

Some example embodiments have application for mass transit vehicles (e.g., buses, trains, etc.) where frequent stops are made to pickup and drop-off passengers. The passenger stops can be charging stations. To illustrate, FIG. 3 depicts a system for recharging mass transit battery electric vehicles at passenger stops, according to some example embodiments. In particular, FIG. 3 depicts a system 300 for recharging a mass transit battery electric vehicle 302.

The system 300 includes utility services 304 that include a server 306. These services can include other types of devices and computers for receiving and transmitting network communications and providing control of different parts of the system 300 (as further described below). The server 306 includes a control module 308. The control module 308 can be software, firmware, hardware or a combination thereof. For example, the control module 308 can be software that is loaded into a processor for execution therein.

The system 300 also includes a GPS satellite 310 transmits a GPS signal 322 to the mass transit battery electric vehicle 302. For example, the mass transit battery electric vehicle 302 can have an onboard computer. The onboard computer determines a global position of the mass transit battery electric vehicle 302 based on the GPS signal 322. The onboard computer of the mass transit battery electric vehicle 302 is also communicatively coupled to the server 306 (wireless communication 324).

The mass transit battery electric vehicle 302 has a route that includes a number of passenger stops that also serve as recharging stations for recharging the mass transit battery electric vehicle 302—a passenger stop 310, a passenger stop 312, a passenger stop 314, a passenger stop 316, a passenger stop 318, and a passenger stop 320. In this example, the mass transit battery electric vehicle 302 has a circular route. The circular route is configured such that the order of the passenger stops are the passenger stop 310, the passenger stop 312, the passenger stop 314, the passenger stop 316, the passenger stop 318, the passenger stop 320, and returning to the passenger stop 310.

The server 306 is communicatively coupled to each of the passenger stops. In FIG. 3, these communications are shown as a wireless communication. However, such communications can also be wired. The server 306 is communicatively coupled to the passenger stop 310 through a communication 326. The server 306 is communicatively coupled to the passenger stop 312 through a communication 328. The server 306 is communicatively coupled to the passenger stop 314 through a communication 330. The server 306 is communicatively coupled to the passenger stop 316 through a communication 332. The server 306 is communicatively coupled to the passenger stop 318 through a communication 334. The server 306 is communicatively coupled to the passenger stop 320 through a communication 336.

In operation, the mass transit battery electric vehicle 302 needs to maintain a certain charge level to be able to arrive at the next stop in its route. In some example embodiments, the control module 308 determines the amount of time that the mass transit battery electric vehicle 302 is to be at a passenger stop and the amount of power needed to deliver the required minimum level of charge in the time that the mass transit battery electric vehicle 302 is at the stop. For example, the minimum level of charge would be the amount of charge needed to reach the next stop. This minimum level of charge can include some reserve and can be based on various factors (e.g., traffic, weather, number of passengers, amount of power to be expended, etc.). Accordingly, the power output for a same vehicle can vary among the different stops (e.g., stop A requires 1000 volts, stop B requires 220 volts, stop C requires 750 volts, etc.). In some example embodiments, the passenger stops transmit to the control module 308 various data to enable the control module 308 to determine this minimum level of charge for the mass transit battery electric vehicle 302 at the next passenger stop. For example, all, some or only the next passenger stop transmits to the control module 308 the number of waiting passengers, the average load time for the stop, power output options, etc. A given passenger stop can transmit its data when the passenger stop is the next stop for the mass transit battery electric vehicle 302. For example, after the mass transit battery electric vehicle 302 leaves the passenger stop 310, the passenger stop transmits its data (through the communication 328) to the control module 308. In some example embodiments, the passenger stops provide average load time, number of waiting passengers, etc. based on past stops at this particular passenger stop for a particular day, time of day, etc. Alternatively or in addition, the passenger stops can provide the number of actual passengers waiting to board. For example, the passenger can register with a device (e.g., a scanner) that is communicatively coupled to the control module 208 while waiting to board. The control module 208 can then receive the number of register passengers. This number can be update each time a new passenger is registered.

The control module 308 also receives data from the mass transit battery electric vehicle 302 (the communication 324) to enable the control module 308 to determine this minimum level of charge for the mass transit battery electric vehicle 302 at the next passenger stop. In some example embodiments, the mass transit battery electric vehicle 302 transmits its current charge, charge capacity and distance to the next stop in the route.

The control module 308 can then determine the power output at the next and subsequent recharging stations to satisfy the required charge level in a specified amount of time (the load time). The control module 308 can transmit this information to at least one the mass transit battery electric vehicle 302 and the next passenger stop. For the scenario where no scheduled stops are planned for a certain number of stops, the control module 308 would configure the route such that the current or previous recharging sessions would need to deliver the appropriate amount of power to at least maintain power to the next scheduled stop.

To illustrate, assume that the anticipated load time at the passenger stop 312 will be longer than the load time for the subsequent passenger stop 314 (because of the number of passengers that are registered to load). The control module 308 would configure the passenger stop 312 to recharge the mass transit battery electric vehicle 302 for a longer period of time. Accordingly, the control module 308 can configure recharge times for an upcoming stop based on anticipated stop times for one or more passenger stops thereafter.

While the system 300 is illustrated in reference to a bus, some example embodiments are applicable to any type mass transit vehicle that includes stops for passenger pickup and drop-off (e.g., trains, trolleys, etc.). Using some example embodiments, electrified trains and trolleys would no longer need continuous contact with a power source. In particular, strategically placed charging stations can be positioned to maintain a certain charge level for these trains and trolleys. In such systems, an electrified third rail would not be required. For trolleys, there would be no need for the supporting infrastructure for overhead electrified wires. Also, these systems for trains and trolleys can be based on power on demand (where power is supplied at the recharging stations when required and not a constant supply of power like conventional systems.

In some of these example embodiments, the recharging station deliver power to the mass transit battery electric vehicles through a contact-less mechanism (e.g., using induction). The recharging station can also determine if power needs to be delivered when a battery electric vehicle is in a position where charge can be delivered. Such embodiments are useful for mass transit where the recharging stations are the passenger stops. In such situations, requiring delivery of power through corded charge equipment can take too much time at each passenger stop where power is needed. Such embodiments for contact-less delivery of power are also applicable to non-mass transit battery electric vehicles.

Operations associated with some example embodiments are now described. In the discussion below, the flowcharts will be described with reference to the block diagrams presented above. However, in some example embodiments, the operations can be performed by logic not described in the block diagrams. In certain embodiments, the operations can be performed by executing instructions residing on machine-readable media (e.g., software), while in other embodiments, the operations can be performed by hardware and/or other logic (e.g., firmware). In some example embodiments, the operations can be performed in series, while in other embodiments, one or more of the operations can be performed in parallel. Moreover, some embodiments can perform less than all the operations shown in any flowchart.

Figure 4:
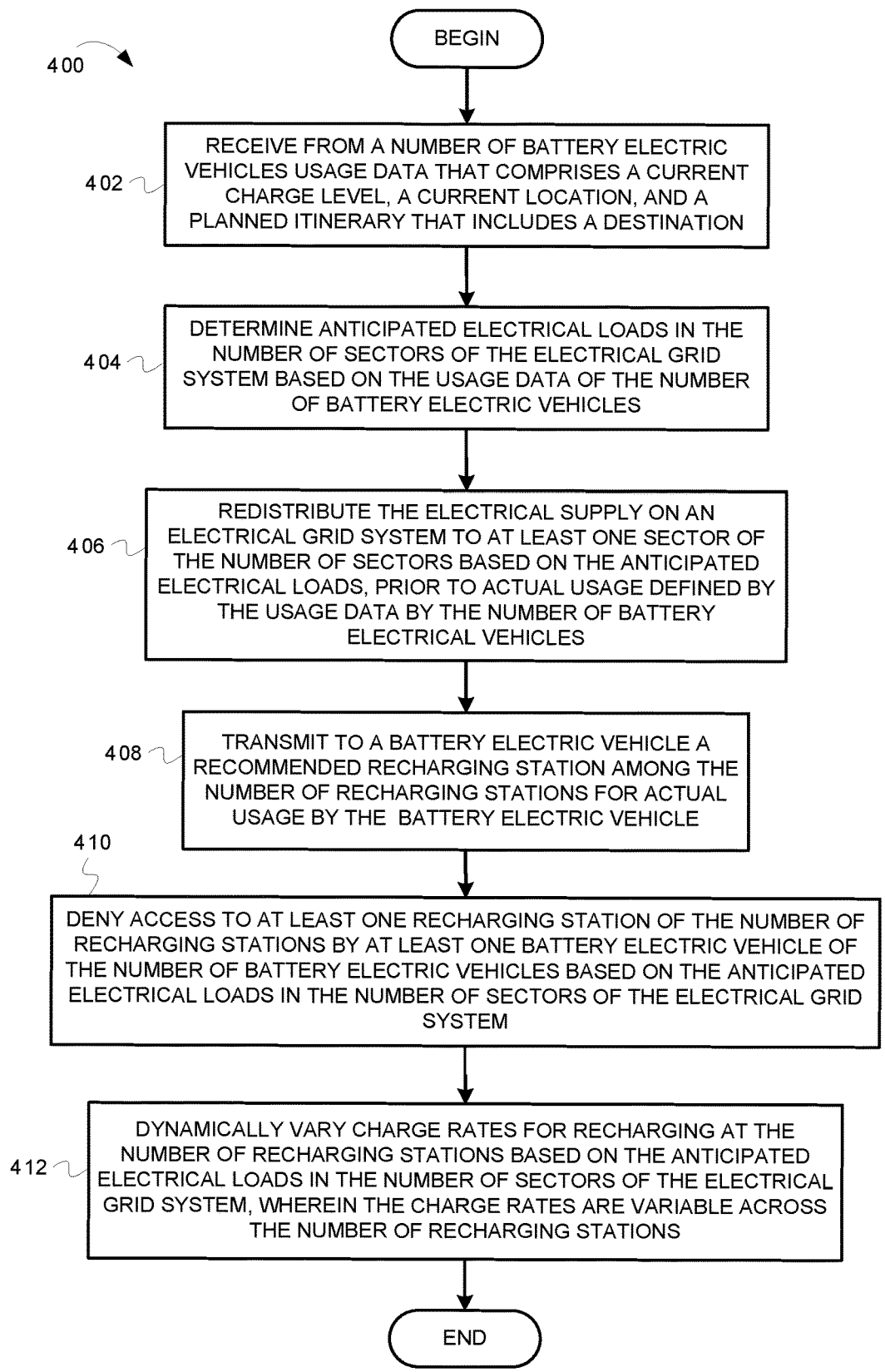
FIG. 4 depicts a flowchart of operations for recharging battery electric vehicles, according to some example embodiments.

FIG. 4 depicts a flowchart of operations for recharging battery electric vehicles, according to some example embodiments. In particular, FIG. 4 depicts a flowchart 400 that can be performed by the control module 120 of FIG. 1. The operations of the flowchart 400 are described in reference to FIGS. 1 and 2. The operations of the flowchart 400 begin at block 402.

At block 402, the control module 120 receives from a number of battery electric vehicles usage data that comprises a current charge level, a current location, and a planned itinerary that includes a destination. For example with reference to FIG. 2, the control module 120 receives this usage data from some or all of the battery electric vehicles 240-278. Operations of the flowchart 400 continue at block 404.

At block 404, the control module 120 determines anticipated electrical loads in the number of sectors of the electrical grid system based on the usage data of the number of battery electric vehicles. In particular, the control module 120 can determine that the sector A 202 will require more power from the electrical grid for the recharging stations 210-212 in the next hour for at least two hours. Similarly, the control module 120 can determine that the sector D 208 will require less power from the electrical grid for the recharging stations 226-230 during the same time period. The usage data can include current charge level, charge capacity, location, and planned itinerary. For example, based on this data, the control module 120 determines that a given battery electric vehicle is required to use a given recharging station because this is the only recharging station close enough to enable the driver to recharge their vehicle prior to the charge levels being depleted. With reference to FIG. 2 as an example, the control module 120 receives the usage data from the battery electric vehicle 278. Based on this data, the control module 120 determines that the battery electric vehicle 178 is headed west to a final destination beyond the sector C 206. Also because of the current charge level, the battery electric vehicle 278 will arrive at the recharging station 230 in 20 minutes and will require a recharge at the recharging station 230 for at least 30 minutes at a certain power output rate in order to have sufficient charge to make it to the recharging station 224 (in route to its final destination). Accordingly, the control module 120 can receive this usage data from multiple battery electric vehicles to determine amount of usage, time period of use, amount of power needed, etc, at the different recharging stations. Based on these anticipated electrical loads, the control module 120 can perform one or more of the operations at blocks 406-412 (described below). For example, in some scenarios, the control module 120 performs the operations at block 406 and 412. In another scenario, the control module 120 performs the operations at blocks 406, 408, 410, and 412. Operations of the flowchart 400 continue at block 406.

At block 406, the control module 120 redistributes the electrical supply on an electrical grid system to at least one sector of the number of sectors based on the anticipated electrical loads, prior to actual usage defined by the usage data by the number of battery electric vehicles. For example, with reference to FIG. 2, the control module 120 can shift power being supplied to the recharging stations 210-212 in the sector A 202 to the recharging stations 216-224 in the sector C 206 for the next six hours because the usage data of the battery electric vehicles indicate that more power is needed in the sector C 206 to meet demand for those vehicles planning to recharge in the recharging stations therein for the next six hours. Operations of the flowchart 400 continue at block 408.

At block 408, the control module 120 transmits to a battery electric vehicle a recommended recharging station among the number of recharging stations for actual usage by the battery electric vehicle. In particular, the control module 120 can recommend a recharging station to a battery electric vehicle based on its own usage data and other vehicles' usage data. For example with reference to FIG. 2, the control module 120 can send a communication to the battery electric vehicle 252 to recharge at the recharging station 210 instead of the recharging station 212 because all of the spots are being used in the recharging station 212, the cost is higher at the recharging station 212, etc. Operations of the flowchart 400 continue at block 410.

At block 410, the control module 120 denies access to at least one recharging station of the number of recharging stations by at least one battery electric vehicle of the number of battery electric vehicles based on the anticipated electrical loads in the number of sectors of the electrical grid system. In particular, the control module 120 can deny access because there would be insufficient power to accommodate the anticipated electrical load. For example with reference to FIG. 2, the control module 120 can deny access to the recharging station 210 by the battery electric vehicle 240 because the battery electric vehicles 250 and 242 are about to access the recharging station 210 and use the available power to recharge. The control module 120 can provide a recommendation to the battery electric vehicle 240 to use the recharging station 212 (as described at block 408). Operations of the flowchart 400 continue at block 412.

At block 412, the control module 120 dynamically varies charge rates for recharging at the number of recharging stations based on the anticipated electrical loads in the number of sectors of the electrical grid system, wherein the charge rates are variable across the number of recharging stations. For example with reference to FIG. 2, the control module 120 can increase the charge rates for the recharging stations 216-224 because of level of anticipated demand. Alternatively, the control module 120 can decrease the charge rates for the recharging station 228 because of a lack of anticipated demand. Operations of the flowchart 400 are complete.

Figure 5:
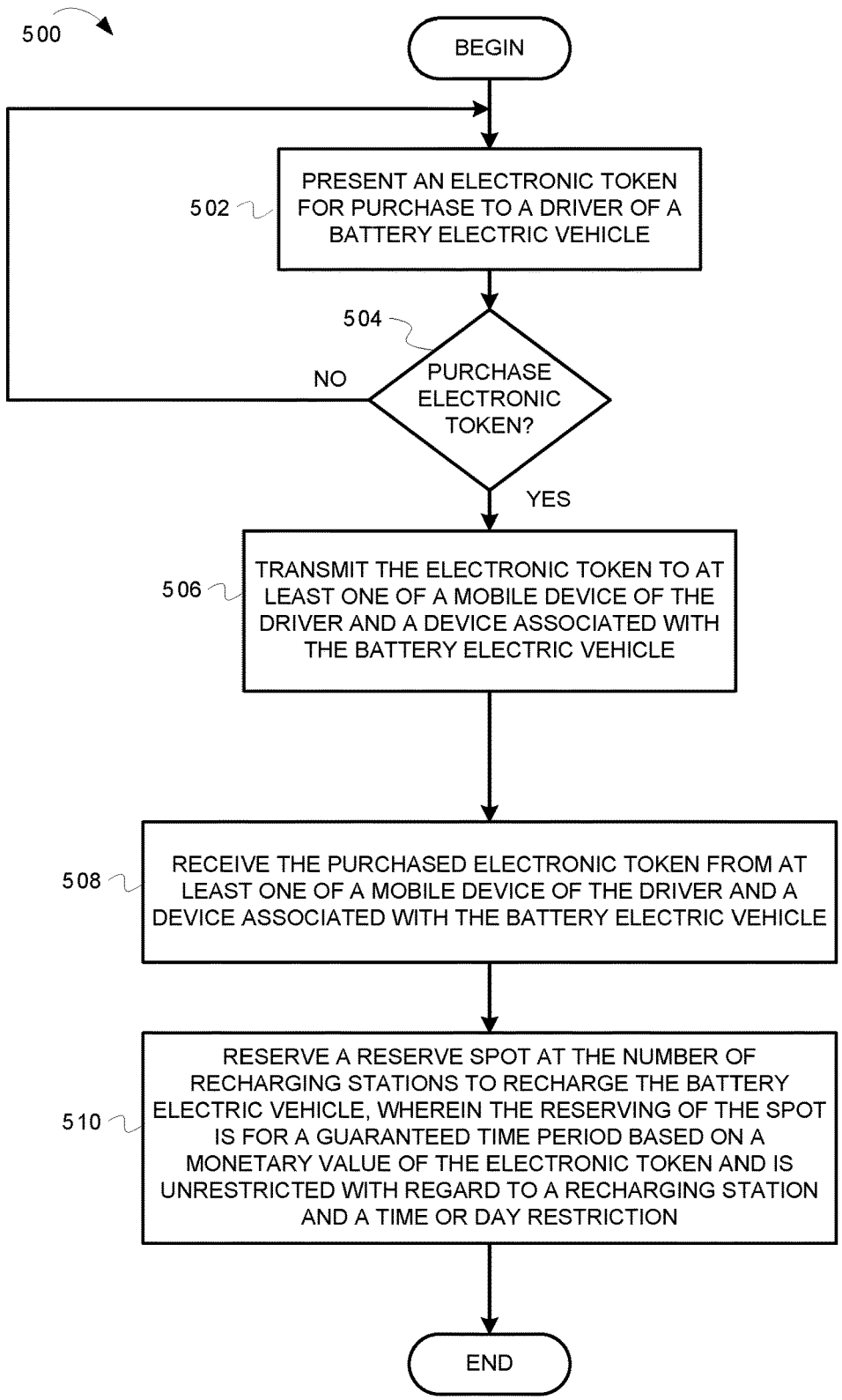
FIG. 5 depicts a flowchart of operations for enhanced usage and pricing for recharging battery electric vehicles, according to some example embodiments.

FIG. 5 depicts a flowchart of operations for enhanced usage and pricing for recharging battery electric vehicles, according to some example embodiments. In particular, FIG. 5 depicts a flowchart 500 that can be performed by the control module 120 of FIG. 1. The operations of the flowchart 500 are described in reference to FIG. 1. The operations of the flowchart 500 begin at block 502.

At block 502, the control module 120 presents an electronic token for purchase to a driver of a battery electric vehicle. For example, the control module 120 can transmit an offer to purchase the electronic token based on an advertisements, email, text message, direct message, etc. to the mobile device of the driver, the onboard computer of the battery electric vehicle associated with the driver, etc. The electronic token can represent a given recharge time. The electronic token can enable the driver of a battery electric vehicle to reserve a spot at a particular recharging station for a specific time and for a specific time period. In some example embodiments, the electronic token enables the driver to reserve a spot at a particular recharging station for a specific time period (independent of a specific time). In some example embodiments, the electronic token enables the driver to reserve a spot for a specific time period (independent of a specific time and independent of a particular recharging station). In other words, the driver can charge their battery electric vehicle for a set time period (e.g., one hour) at any charging location at any time. Operations of the flowchart 500 continue at block 504.

At block 504, the control module 120 determines whether the driver has purchased the electronic token. The control module 120 can receive a transmission from the driver's mobile device or onboard computer of their battery electric vehicle that confirms purchase. For example, the driver can provide their credit card number, debit card number, etc. through the electronic transmission. If the driver does not purchases the electronic token, operations of the flowchart return to block 502, where the electronic token can again be presented to the driver. If the driver does purchase the electronic token, operations of the flowchart 500 continue at block 506.

At block 506, the control module 120 transmits the electronic token to at least one of a mobile device of the driver and a device associated with the battery electric vehicle. With reference to FIG. 1, the control module 120 can send the electronic token through the wireless communication 124 to the mobile device 104 or the device (e.g., onboard computer) of the battery electric vehicle 102 for storage in a nonvolatile machine readable medium. Operations of the flowchart 500 continue at block 508.

At block 508, the control module 120 receives the purchased electronic token from at least one of a mobile device of the driver and a device associated with the battery electric vehicle. With reference to FIG. 1, the control module 120 receives the purchased electronic token through the wireless communication 124 from the mobile device of the driver and the device associated with the battery electric vehicle. Operations of the flowchart 500 continue at block 510.

At block 510, the control module 120 reserves a reserve spot at the number of recharging stations to recharge the battery electric vehicle based on the electronic token. In some example embodiments, the reserving of the spot is for a guaranteed time period based on a monetary value of the electronic token and is unrestricted with regard to a recharging station and a time or day restriction. Accordingly, the driver can arrive at any recharging station and is guaranteed a spot for recharging (without having to wait). In some example embodiments, the value of the electronic token can vary depending on its usage. For example, the control module 120 can present an option to a driver having the electronic token to redeem the token at the closest recharging station within a defined time period (e.g., one hour). In return, the electronic token retains a percentage of its value. To illustrate, the driver can recharge now for one hour (the value of the token) and retain 30 minutes of recharge time anywhere and anytime else. Operations of the flowchart 500 are complete.

Figure 6:
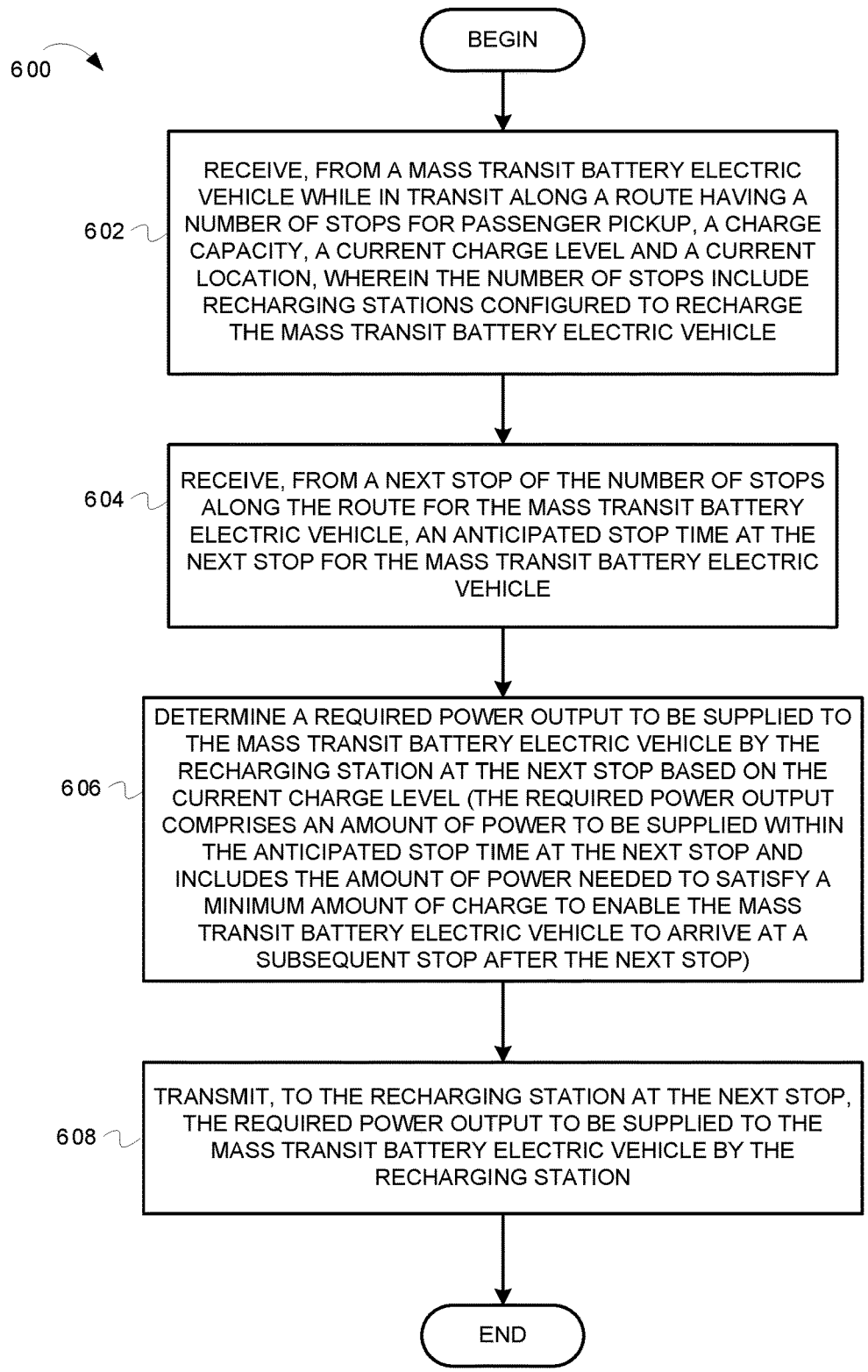
FIG. 6 depicts a flowchart of operations for recharging mass transit battery electric vehicles at passenger stops, according to some example embodiments.

FIG. 6 depicts a flowchart of operations for recharging mass transit battery electric vehicles at passenger stops, according to some example embodiments. In particular, FIG. 6 depicts a flowchart 600 that can be performed by the control module 308 of FIG. 3. The operations of the flowchart 600 are described in reference to FIG. 3. The operations of the flowchart 600 begin at block 602.

At block 602, the control module 308 receives, from a mass transit battery electric vehicle while in transit along a route having a number of stops for passenger pickup, a charge capacity, a current charge level and a current location. With reference to FIG. 3, the control module 308 receives this data from the mass transit battery electric vehicle 302 through the wireless communication 324. Operations of the flowchart 600 continue at block 604.

At block 604, the control module 308 receives, from a next stop along the route for the mass transit battery electric vehicle, an anticipated stop time at the next stop for the mass transit battery electric vehicle. With reference to FIG. 3, the control module 308 receives the anticipated stop time from the passenger stop 312. The anticipated stop time can be based on the number of passengers registered to get on and get off the mass transit battery electric vehicle 302 at the passenger stop 312. Operations of the flowchart 600 continue at block 606.

At block 606, the control module 308 determines a required power output to be supplied to the mass transit battery electric vehicle by the recharging station at the next stop based on the current charge level. The required power output includes an amount of power to be supplied within the anticipated stop time at the next stop and includes the amount of power needed to satisfy a minimum amount of charge to enable the mass transit battery electric vehicle to arrive at a subsequent stop after the next stop. With reference to FIG. 3, the control module 308 can determine the minimum amount of charge needed at the passenger stop 312 to enable the mass transit battery electric vehicle 302 to arrive at the passenger stop 314 (assuming that the mass transit battery electric vehicle 302 stops at the passenger stop 314). Operations of the flowchart 600 continue at block 608.

At block 608, the control module 308 transmits, to the recharging station at the next stop, the required power output to be supplied to the mass transit battery electric vehicle by the recharging station. With reference to FIG. 3, the control module 308 transmits, to the recharging station 312, the required power output (including the amount of power and time) to be supplied to the mass transit battery electric vehicle 302 at the recharging station 312. Operations of the flowchart 600 are complete.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
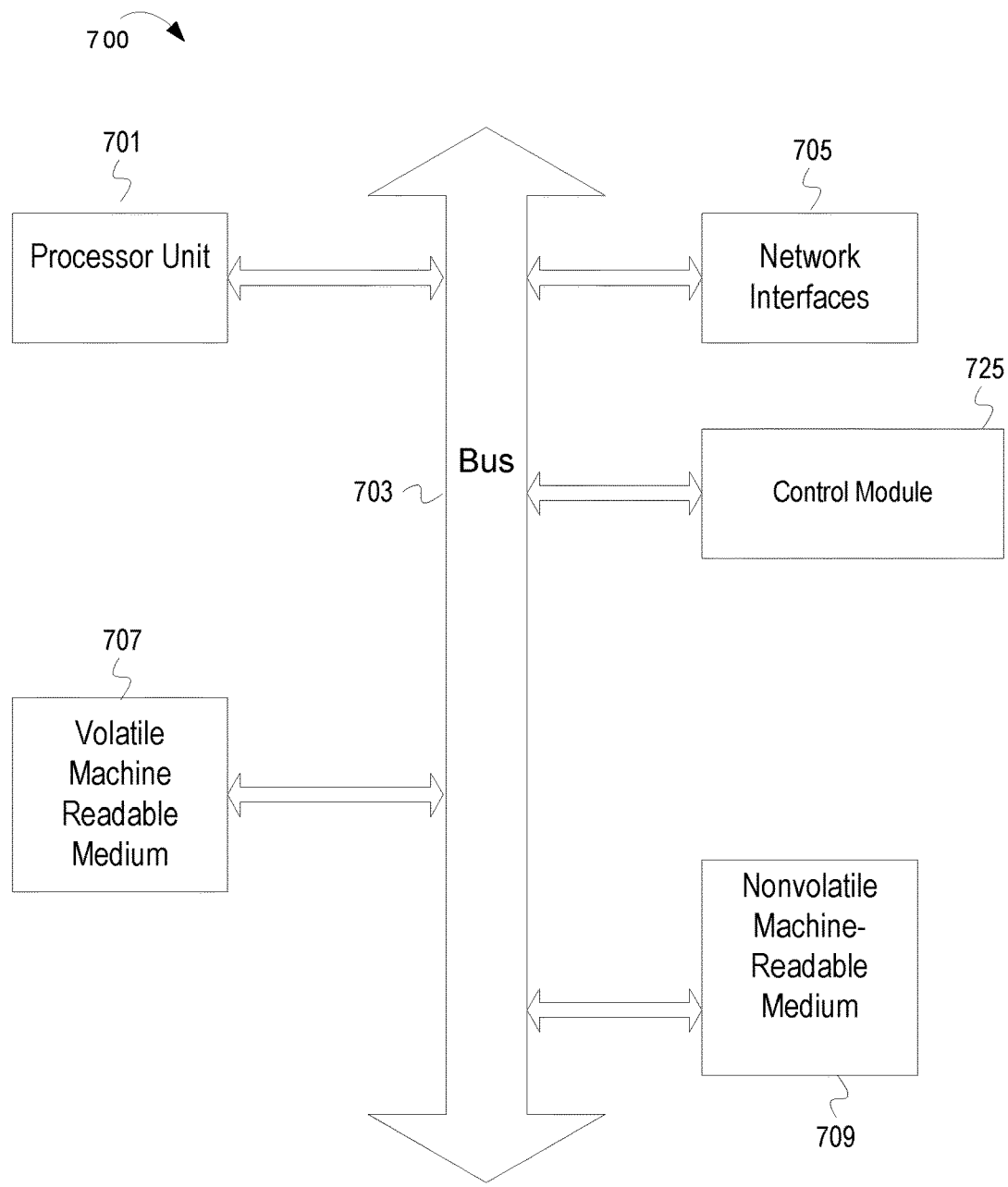
FIG. 7 depicts a computer system, according to some example embodiments.

FIG. 7 depicts a computer system, according to some example embodiments. In particular, a computer system 700 can be representative of a node that is coupled to one or more link-local zones (as described herein). The computer system 700 includes a processor unit 701 (possibly including multiple processors, multiple cores, multiple nodes, and/or implementing multi-threading, etc.). The computer system 700 includes a volatile machine readable medium 707. The volatile machine readable medium 707 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 700 also includes a bus 703 (e.g., PCI, ISA, PCI-Express, HyperTransport®, InfiniBand®, NuBus, etc.), a network interface 705 (e.g., an ATM interface, an Ethernet interface, a Frame Relay interface, SONET interface, wireless interface, etc.), and a nonvolatile machine-readable medium 709 (e.g., optical storage, magnetic storage, etc.). The computer system 700 includes a control module 725 that can be representative of the control module 120 of FIG. 1 and the control module 308 of FIG. 3 and can perform the operations for control power distribution and the battery electric vehicles (as described herein). Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the nonvolatile machine readable medium 709, the volatile machine-readable medium 707, the network interface 705, and the interface configuration module 725 are coupled to the bus 703. Although illustrated as being coupled to the bus 703, the volatile machine-readable medium 707 can be coupled to the processor unit 701.

While the embodiments are described with reference to various implementations and exploitations, it will be understood that these embodiments are illustrative and that the scope of the inventive subject matter is not limited to them. In general, techniques for recharging battery electric vehicles as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for recharging a number of battery electric vehicles, the method comprising:
    receiving, by a control module configured to control an electrical grid system that include a number of recharging stations that are configured to recharge the number of battery electric vehicles, from the number of battery electric vehicles that are to recharge at a number of recharging stations of the electrical grid system from an electrical supply provided by a power generator coupled to the electrical grid system, usage data that comprises a current charge level, a current location, and a planned itinerary that includes a destination;
    determining, by the control module, anticipated electrical loads at the number of recharging stations of the electrical grid system based on the usage data of the number of battery electric vehicles;
    denying, in response to receiving a communication including the anticipated electrical loads, access to at least one recharging station of the number of recharging stations by at least one battery electric vehicle of the number of battery electric vehicles in a number of sectors of the electrical grid system; and
    transmitting to the at least one battery electric vehicle of the number of battery electric vehicles, a recommended recharging station among the number of recharging stations for actual usage by the at least one battery electric vehicle, wherein the recommended recharging station has more recharge capacity than the recharging station that is closest to the current location of the at least one battery electric vehicle;
    receiving, through a network communication, an electronic token from at least one of a mobile device of a driver of at least one battery electric vehicle of the number of battery electric vehicles and a device associated with the at least one battery electric vehicle; and
    responsive to receiving the electronic token, reserving a reserved spot at the recommended recharging station to recharge the at least one battery electric vehicle, wherein reservation of the spot is for a guaranteed time period based on a monetary value of the electronic token and is unrestricted with regard to a recharging station of the number of recharging stations where the reserved spot is located and is unrestricted with regard to a time and a day.

2. The method of claim 1, further comprising dynamically varying charge rates for recharging at the number of recharging stations based on the anticipated electrical loads, wherein the charge rates are variable across the number of recharging stations.

3. The method of claim 2, further comprising:
    determining, by the control module, an anticipated charge rate for recharging at the number of recharging stations for at least one battery electric vehicle of the number of battery electric vehicles for the planned itinerary for the at least one battery electric vehicle, wherein the anticipated charge rate is based on the charge rates being dynamically varied based on the anticipated electrical loads; and
    transmitting the anticipated charge rate to at least one of a device of the at least one battery electric vehicle and a mobile device associated with an operator of the at least one battery electric vehicle.

4. The method of claim 1, further comprising redistributing the electrical supply on the electrical grid system to at least one recharging station of the number of recharging stations based on the anticipated electrical loads, prior to actual usage defined by the usage data by the number of battery electric vehicles.

5. The method of claim 1, wherein the recommended recharging station provided by the control module is based on an environmental condition that comprises at least one of traffic, geographical terrain, and weather.

6. The method of claim 1, further comprising determining the recommended recharging station based, at least in part, on at least one of cost, recharge time, and environmental impact, wherein actual usage of the recommended recharging station by the at least one battery electric vehicle provides a more even distribution of the anticipated electrical loads on the electrical grid system than actual usage of the recharging station that is closest to the current location.

7. A computer program product for recharging a number of battery electric vehicles, the computer program product comprising:
    a non-transitory computer readable storage medium having computer usable program code embodied therewith, the computer usable program code comprising a computer usable program code configured to:
        receive from the number of battery electric vehicles that are to recharge at a number of recharging stations of an electrical grid system from an electrical supply provided by a power generator coupled to the electrical grid system, usage data that comprises a current charge level, a current location, and a planned itinerary that includes a destination;
        determine anticipated electrical loads at the number of recharging stations of the electrical grid system based on the usage data of the number of battery electric vehicles;
        deny, in response to receiving a communication including the anticipated electrical loads, access to at least one recharging station of the number of recharging stations by at least one battery electric vehicle of the number of battery electric vehicles in a number of sectors of the electrical grid system; and
        transmit to the at least one battery electric vehicle of the number of battery electric vehicles, a recommended recharging station among the number of recharging stations for actual usage by the at least one battery electric vehicle, wherein the recommended recharging station has more recharge capacity than the recharging station that is closest to the current location of the at least one battery electric vehicle;
        receive, through a network communication, an electronic token from at least one of a mobile device of a driver of at least one battery electric vehicle of the number of battery electric vehicles and a device associated with the at least one battery electric vehicle; and
    responsive to receipt of the electronic token, reserve a reserved spot at the recommended recharging station to recharge the at least one battery electric vehicle, wherein reservation of the spot is for a guaranteed time period based on a monetary value of the electronic token and is unrestricted with regard to a recharging station of the number of recharging stations where the reserved spot is located and is unrestricted with regard to a time and a day.

8. The computer program product of claim 7, wherein the computer usable program code is configured to dynamically vary charge rates for recharging at the number of recharging stations based on the anticipated electrical loads of the electrical grid system, wherein the charge rates are variable across the number of recharging stations.

9. The computer program product of claim 8, wherein the computer usable program code is configured to:
   determine an anticipated charge rate for recharging at the number of recharging stations for at least one battery electric vehicle of the number of battery electric vehicles for the planned itinerary for the at least one battery electric vehicle, wherein the anticipated charge rate is based on the charge rates being dynamically varied based on the anticipated electrical loads; and
   transmit the anticipated charge rate to at least one of a device of the at least one battery electric vehicle and a mobile device associated with a driver of the at least one battery electric vehicle.

10. The computer program product of claim 7, wherein the computer usable program code is configured to redistribute the electrical supply on the electrical grid system to at least one recharging station of the number of recharging stations based on the anticipated electrical loads, prior to actual usage defined by the usage data by the number of battery electric vehicles.

11. The computer program product of claim 7, wherein the recommended recharging station creates a more even distribution of the anticipated electrical loads on the electrical grid system in comparison to actual usage of the recharging station that is closest to the current location of the at least one battery electric vehicle.

12. The computer program product of claim 7, wherein the recommended recharging station is based on an environmental condition that comprises at least one of traffic, geographical terrain, and weather.

13. The computer program product of claim 7, wherein recommendation of the recommended recharging station is derived from at least one of cost, recharge time, and environmental impact, wherein actual usage of the recommended recharging station by the at least one battery electric vehicle provides a more even distribution of the anticipated electrical loads on the electrical grid system than actual usage of the recharging station that is closest to the current location.

14. An apparatus for recharging battery electric vehicles, the apparatus comprising:
   a processor; and
   a control module executable on the processor, the control module configured to:
      receive from the number of battery electric vehicles that are to recharge at a number of recharging stations of an electrical grid system from an electrical supply provided by a power generator coupled to the electrical grid system, usage data that comprises a current charge level, a current location, and a planned itinerary that includes a destination;
      determine anticipated electrical loads at the number of recharging stations of the electrical grid system based on the usage data of the number of battery electric vehicles;
      deny, in response to receiving a communication including the anticipated electrical loads, access to at least one recharging station of the number of recharging stations by at least one battery electric vehicle of the number of battery electric vehicles in a number of sectors of the electrical grid system; and
      transmit to the at least one battery electric vehicle of the number of battery electric vehicles, a recommended recharging station among the number of recharging stations for actual usage by the at least one battery electric vehicle, wherein the recommended recharging station has more recharge capacity than the recharging station that is closest to the current location of the at least one battery electric vehicle;
      receive, through a network communication, an electronic token from at least one of a mobile device of a driver of at least one battery electric vehicle of the number of battery electric vehicles and a device associated with the at least one battery electric vehicle; and
      responsive to receipt of the electronic token, reserve a reserved spot at the recommended recharging station to recharge the at least one battery electric vehicle, wherein reservation of the spot is for a guaranteed time period based on a monetary value of the electronic token and is unrestricted with regard to a recharging station of the number of recharging stations where the reserved spot is located and is unrestricted with regard to a time and a day.

15. The apparatus of claim 14, wherein the control module is configured to redistribute the electrical supply on the electrical grid system to at least one recharging station of the number of recharging stations based on the anticipated electrical loads, prior to actual usage defined by the usage data by the number of battery electric vehicles.

16. The apparatus of claim 14, wherein the recommended recharging station is based on an environmental condition that comprises at least one of traffic, geographical terrain, and weather.

17. The apparatus of claim 14, wherein recommendation of the recommended recharging station is derived from at least one of cost, recharge time, and environmental impact, wherein actual usage of the recommended recharging station by the at least one battery electric vehicle provides a more even distribution of the anticipated electrical loads on the electrical grid system than actual usage of the recharging station that is closest to the current location.

* * * * *